Jan. 19, 1965  F. E. SACHERS  3,165,925
PUSH-PULL GAUGE AND MAGNETIC OVERRUNNING LOCKING MEANS
Filed June 15, 1962  3 Sheets-Sheet 2

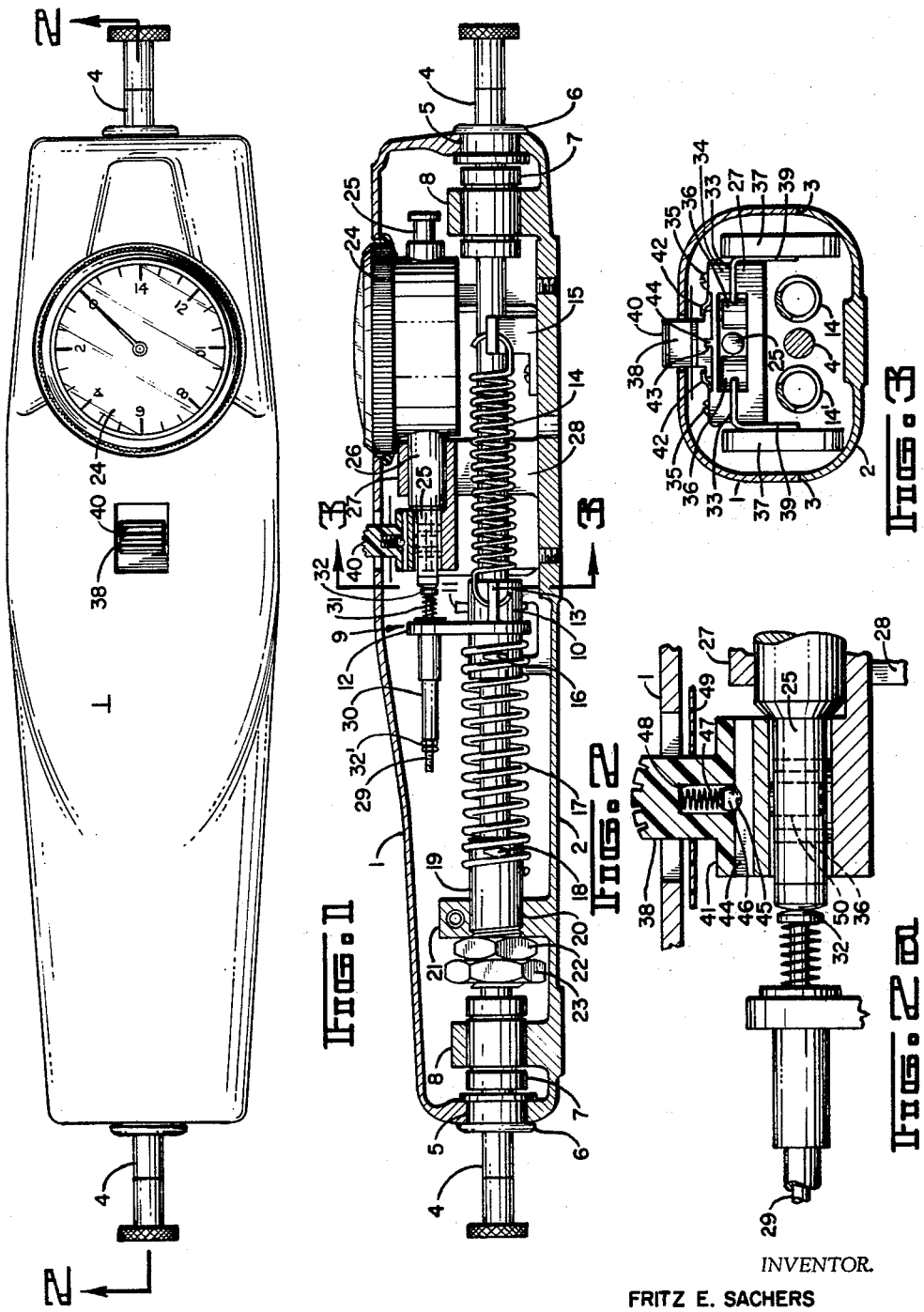

INVENTOR.
FRITZ E. SACHERS
BY
Robertson & Smyth
ATTORNEYS.

Jan. 19, 1965  F. E. SACHERS  3,165,925
PUSH-PULL GAUGE AND MAGNETIC OVERRUNNING LOCKING MEANS
Filed June 15, 1962  3 Sheets-Sheet 3

INVENTOR.
FRITZ E. SACHERS
BY
ATTORNEYS.

3,165,925
PUSH-PULL GAUGE AND MAGNETIC OVER-
RUNNING LOCKING MEANS
Fritz E. Sachers, New York, N.Y., assignor to Aero-
Chatillon Corporation, a corporation of New York
Filed June 15, 1962, Ser. No. 202,835
4 Claims. (Cl. 73—141)

The invention relates to push-pull gauges and to improvements in magnetic overrunning locking means for members having linear movement in such gauges or for other applications.

When spring-pressed wedges or other known mechanical locking means are used to permit overrunning movement of a plunger rod in one direction while locking it against return movement in the opposite direction, friction losses at the wedges are likely to be non-uniform. In the case of a push-pull gauge used in force measuring, this is undesirable for it is quite essential that frictional forces opposing operation of the gauge mechanism be maintainable at known, constant values. My invention is concerned with the solution of this and other problems encountered with known devices for this and related purposes.

My invention will be described particularly in relation to its application to a push-pull gauge comprising a member mounted for linear movement in response to externally applied force, means for resiliently resisting such linear movement of the member, indicating means for measuring the extent of such linear movement, and overrunning locking means for holding such member against return movement in the opposite direction.

According to my invention the overrunning locking means comprises:

(a) A locking element adapted to frictionally engage the movable gauge member when it is moved into one position and to be freed from such frictional engagement when moved into another position, (b) Magnetic means for urging the locking element into the one position, and (c) Means for holding the locking element in the other position to permit the movable gauge member to return to its zero position when the externally applied force is removed.

In my preferred construction the locking element is a wedge having two edge portions extending at opposed angles to the line of movement of the movable gauge member, and the magnetic means are arranged to urge the locking element selectively into engagement with either of such edge portions of the wedge. The holding means are movable alternately in the direction of either edge portion to release the wedging element for such selective engagement. In this construction the movable gauge member can be locked in either of two opposed positions (opposed in the sense of the direction of initial movement of the movable gauge member) according to the direction of movement produced by the externally applied force.

With reference to the drawings, I shall now describe the best mode contemplated by me for carrying out my invention.

FIG. 1 is a face view of a push-pull gauge embodying the invention.

FIG. 2 is a vertical longitudinal sectional view taken as indicated at 2—2 in FIG. 1.

FIG. 2a is a detail of FIG. 2 drawn to an enlarged scale and showing the selector button.

FIG. 3 is a vertical transverse sectional view taken as indicated at 3—3 in FIG. 2.

FIGS. 4 to 12 inclusive are detail views showing in a somewhat simplified schematic form the cooperation between the several operating elements of my improved locking means according to various embodiments of the invention.

Figure 4:
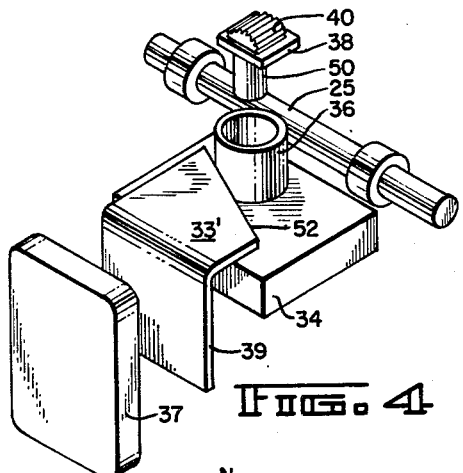

FIG. 4 is an exploded perspective view of the locking means as applied to a movable gauge member intended for measuring movement in one direction only.

Figure 5:
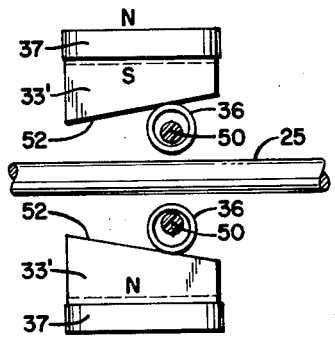

FIG. 5 is a plan view showing a further development of the FIG. 4 construction in which there are a pair of opposed wedging surfaces and a pair of locking elements. Here the locking elements are shown in unlocked position.

Figure 6:
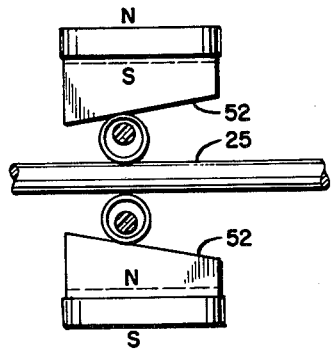

FIG. 6 is a view similar to FIG. 5 but with the locking elements held magnetically in locking position.

Figure 7:
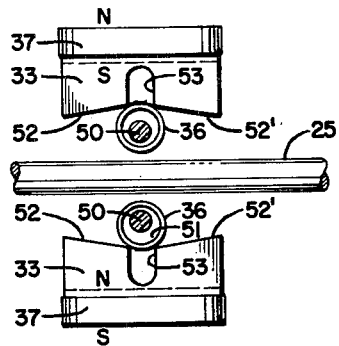

FIG. 7 shows a further development of the construction in which each wedging element has two edge portions extending at opposed angles to the line of movement of the movable gauge member as designed for locking such member in either of two positions according to the direction of movement produced by the externally applied force. Here the locking elements are shown in unlocked, or neutral, position.

Figure 8:
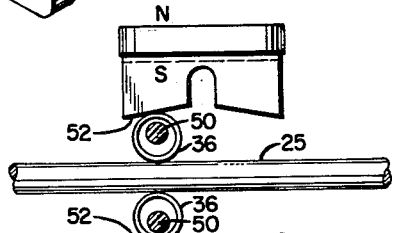

FIG. 8 is a view similar to FIG. 7 showing one of the two locking positions.

Figure 9:
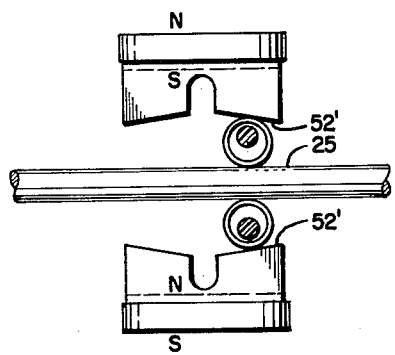

FIG. 9 is a similar view showing the other of the two locking positions.

Figure 10:
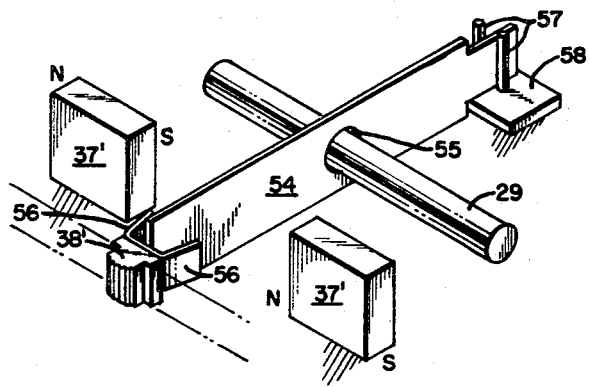
Figure 11:
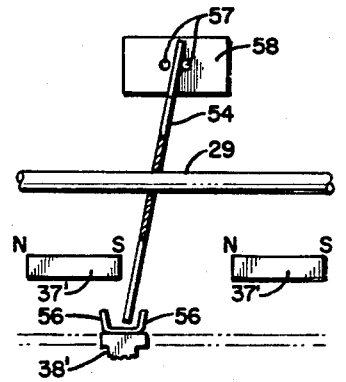
Figure 12:
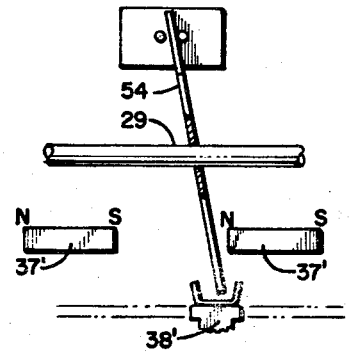

FIGS. 10 to 12 inclusive illustrate a modified construction in which the locking element consists of a plate having an aperture through which the movable gauge member extends.

FIG. 10 being a perspective view with the parts in unlocked position,

FIG. 11 a plan view partly in section showing one of two alternate locking positions, and FIG. 12 a similar view showing the other of the two locking positions.

With reference to FIGS. 1, 2 and 3, I shall first describe my invention in its application to a representative form of push-pull gauge. This gauge comprises a pair of housing members 1 and 2, the meeting edges 3 of which conveniently are made coplanar with the axis of the shaft 4 which extends longitudinally through the housing so as to project from each end thereof. The shaft 4 passes through apertures 5 at the ends of the housing, these apertures being larger than the diameter of the shaft. The clearances between the shaft and apertures are closed by grommets 6.

Shaft 4 is freely movable in an axial direction, such movements being guided by its engagement with ball bushings 7 carried in apertures extending through supporting lugs 8 projecting inwardly from housing member 2. A "calibrator" 9 having a tubular body 10 is fixed to shaft 4 by means of a tapered pin 11 extending through aligned apertures of the calibrator and shaft. Calibrator 9 has a transversely extending flange 12 and a longitudinally extending flange 13 apertured to receive one of the hooked ends of a coil spring 14 disposed to one side of, and parallel to, shaft 4. The other end of spring 14 is hooked through an aperture in an equalizing yoke 15 pivotally mounted upon the base of housing member 2 with the pivot axis lying in a vertical plane passing through the center line of shaft 4. Flange 13 of calibrator 9 as seen in FIG. 2 has a counterpart on the opposite side of shaft 4 for engagement with a second spring 14' (FIG. 3), the opposite end of which engages the equalizing yoke 15. The points of engagement of springs 14 and 14' with yoke 15 are equidistant from the pivot axis of the yoke when the latter is in its normal centered position. This arrangement ensures that each of the springs 14, 14' will carry an equal share of the load imposed when the shaft 4 is moved to the left as viewed in FIG. 2.

The tubular body 10 of calibrator 9 has a pair of oppositely extending lugs 16 adapted to be received between the coils of coil spring 17 in a selected position of adjustment for calibration of the gauge. Coil spring 17 surrounds the shaft 4, and its other end engages a pair of lugs 18 projecting on opposite sides of a calibrator 19 which is in the form of a tube loosely surrounding the shaft 4 so that the shaft can move longitudinally with respect to this member. The calibrator 19 passes through an aperture 20 in lug 21 projecting inwardly from housing member 2. The left-hand end of calibrator 19 is threaded into an adjustment nut 22 and lock nut 23, providing means for adjusting calibrator 19 lengthwise of the gauge for calibration. Springs 14 and 14' are in opposition to spring 17, all of these springs being in tension at all times. As the shaft 4 is pressed or pulled to the left as viewed in FIG. 2, the tension in spring 17 would be diminished and that in springs 14 and 14' increased. Conversely, when the shaft 4 is pressed or pulled to the right, the tension in springs 14 and 14' is diminished and that in spring 17 increased.

At 24 I have indicated a gauge dial assembly. This can be of any conventional or known construction wherein a dial with its pointer and associated actuating mechanism provides a reading in units of force measurement. This mechanism is actuated in the usual manner by a plunger 25 which constitutes the "movable gauge member" to which I have referred in the opening summary of the invention. The plunger 25 is axially movable through sleeve 26 extending from the casing of the gauge dial mechanism. Sleeve 26 is carried in a transverse support 27 fixed to lugs 28 projecting inwardly at the opposite sides of housing member 2.

Actuating movements of shaft 4 are transmitted to plunger 25 through the laterally extending flange 12 of calibrator 9 and an associated spring pressed plunger 29 designed to absorb shock and to protect the delicate gauge mechanism 24 from damage due to overloading or impact stresses. Plunger 29 is carried in a guide sleeve or bushing 30 fixed in flange 12. A coil spring 31 surrounds plunger 29 bearing at one end against the end of guide sleeve 30 and at the other end against the enlarged end 32 of plunger 29. This spring is in compression and the amount of compression is adjustable by means of adjusting and lock nuts 32' threaded on the left-hand end of plunger 29 and bearing against the corresponding end of guide sleeve 30.

The wedging elements 33 (FIG. 3) are clamped between upstanding lugs of transverse support 27 and downwardly extending lugs of guide member 34 by means of screws 35 extending through aligned apertures in the several members and threaded into support 27. Plunger 25 of the gauge mechanism extends between support 27 and guide 34. At either side of plunger 25 and within the space between members 27 and 34, locking elements in the form of rollers 36 are inserted. The position of the rollers at any particular time is governed by the conjoint action of a pair of magnets 37 and a mechanical selector button 38. Magnets 37 preferably are of the permanent type, such as those made of alnico, and they are arranged in the position best shown in FIGS. 3 and 7 where they are held magnetically against the downwardly extending legs 39 of wedging elements 33. The wedging elements 33 are magnetized through their proximity to, or contact with, magnets 37. Selector button 38 is movable left and right as viewed in FIG. 2. It extends through an opening in housing member 1 and is conveniently provided with a serrated surface 40 so that it can be easily moved into one of three selected positions by the thumb of the user. The base 41 of the button is guided along the top of guide member 34 between channels formed by flanges 42 of guide clips held between the head of screws 35 and member 34, and further guided by means of a longitudinal recess 43 surrounding a track 44 projecting upwardly from member 34. Track 44 is provided at its center with a slight depression 45 (FIG. 2a) forming a detent for a ball 46 carried in a recess 48 of button 38. A coil spring 47 disposed within recess 48 resiliently urges ball 46 against the top of track 44 and serves to hold the button in its mid-position when ball 46 comes opposite detent 45 until such time as the button is forced to one side or the other of this position. A dust plate 49 may be provided opposite the opening in the housing for the button 38.

Projecting from the inner end of button 38 are a pair of pins 50 (FIG. 7; see also FIG. 4) which extend into openings 51 of rollers 36. Enough clearance is provided between pins 50 and openings 51 to permit the rollers to be free of engagement with the pins when they are moved into any of the positions shown in FIGS. 7, 8 and 9. Each of the wedging elements 33, FIG. 7, has two edge portions 52, 52' extending at opposed angles to the lines of movement of the movable gauge member, i.e. at opposed angles to the axis of spring pressed plunger 25 which constitutes the movable gauge member of the particular embodiment disclosed.

As shown, for example, in FIG. 7, wedging element 33 is divided into two sections with a groove 53 between. When the button 38 is moved into the position shown in this view, roller 36 seats in the end of this groove where it is held magnetically until button 38 is moved to the left as in FIG. 8, or to the right as in FIG. 9. When the gauge is to be used for measuring a force applied to shaft 4 in a direction which will move the shaft to the right as viewed in FIG. 2, the selector button is moved into the position indicated in FIG. 8. Notice that in this position, the rollers 36 are not in contact with pins 50 of the button, being held in a wedging position between plunger 25 and edge portions 52 of the wedging elements through magnetic action. Now, as force is applied to push or pull the shaft 4 to the right, plunger 29 is carried to the right also and pushes plunger 25 of the gauge instrument in the same direction, i.e. to the right as viewed in FIG. 8. Plunger 25 can move freely to the right when the rollers are in the position here shown. However, once the force on the gauge has been released, conjoint action of the springs 14, 14' and 17 moves shaft 4 to its initial position of rest. Were the actuator button to be in the position shown in FIG. 7, gauge plunger 25 would then be permitted to move to the left and thereby return to its initial, or zero, position. However, this return movement is prevented by the magnetic locking action of the rollers 36 because any tendency of the gauge plunger 25 to move to the left wedges the rollers 36 tightly between the edge portions of the plunger and the edge portions 52 of the wedging elements.

When the gauge is to be used in a manner which causes the applied force to move shaft 4 to the left as viewed in FIG. 2, the actuator button will be moved into the position indicated in FIG. 9 wherein the gauge plunger 25 is free to move to the left as shaft 14 moves to the left, but is restrained against return movement when the force applied to shaft 4 is removed.

Thus, for either direction of operation, the reading of the pointer of the gauge dial will be locked at the position corresponding to the maximum force reading, permitting the gauge to be read with a high degree of accuracy. The magnetic locking system reduces friction losses at the wedges and increases the uniformity of such losses so that they will be maintained at known constant values with a sharply defined and limited plus or minus error.

In FIGS. 5 and 6, my overrunning locking means has been simplified for use in the case where the direction of overrunning is always the same, FIG. 5 showing the unlocked position which permits free movement of the gauge plunger 25 in either direction, and FIG. 6 showing the locking position in which return movement of gauge plunger 25 to the left is prevented, locking the gauge at its point of maximum reading.

FIG. 4 illustrates a further simplification in which a single wedge surface 52 is used. In this simplified case my overrunning locking means for a member 25 mounted for linear movement in response to an externally applied force comprises:

(a) A locking element 36 adapted to frictionally engage the member 25 when moved into one position and to be freed from such frictional engagement when moved into another position, (b) Magnetic means 37 for urging the locking element 36 into the one position, and (c) Means 38, 50 for holding the locking element 36 in the other position to permit the member 25 to return to its zero position when the externally applied force is removed.

According to the further embodiment of my invention illustrated in FIGS. 10 to 12 inclusive:

(d) The locking element consists of a plate 54 having an aperture 55 through which the member 29 extends, this aperture being slightly larger than the diameter of member 29 and plate 54 being movable into either of the two opposed locking positions shown in FIGS. 11 and 12, and (e) The magnetic means 37' are arranged to urge the plate 54 selectively into either of such two opposed locking positions in which the edges of the aperture 55 pinch the sides of the member 29 to produce frictional engagement, and (f) The means for holding the locking plate 54 in position to permit member 29 to return to its zero position consists of the selector button 38' which is movable alternately in the direction of either of its two locking positions.

By virtue of this arrangement the locking means can be adjusted to predetermine the direction of overrunning of member 29. In the FIG. 11 adjustment, member 29 can overrun to the left; in the FIG. 12 adjustment it can overrun to the right. One end of plate 54 is loosely received between a pair of ears 56 extending from the back of the actuator button 38'. The other end is mounted for loose pivotal movement between a pair of pins 57 extending from support 58. Notice that in either of the overrunning locking positions of FIGS. 11 and 12, the one end of plate 54 is free from contact with the ears 56 of the selector button. Therefore, the overrunning action is controlled entirely by the magnetic means.

The terms and expressions which I have employed are used in a descriptive and not a limiting sense, and I have no intention of excluding equivalents of the invention described and claimed. For example, wedge surfaces 52, 52' may be curved instead of straight, and locking elements 36 may be spherical instead of cylindrical.

I claim:

1. A push-pull gauge comprising a member mounted for linear movement in response to externally applied force, means for resiliently resisting such linear movement of said member, indicating means for measuring the extent of such linear movement, and overrunning locking means for holding said member against return movement in the opposite direction, said overrunning locking means comprising:

(a) a wedging element having two edge portions extending at opposed angles to the line of movement of said member, (b) a locking element disposed between said edge portions of the wedging element and an edge portion of said member, (c) magnetic means arranged to urge the locking element selectively into wedging engagement between said member and either of said edge portions of the wedging element, and (d) means for moving said locking element away from its position of wedging engagement and freeing it from the locking effect of said magnetic means to permit said member to return to its zero position when said externally applied force is removed, (e) said means for moving said locking element being movable alternatively in the direction of either edge portion to release the wedging element for such selective engagement, by virtue of all of which said member can be locked in either of two opposed positions according to the direction of movement produced by said externally applied force.

2. A push-pull gauge according to claim 1 in which:

(f) said locking element consists of a roller, and (g) said means for moving said locking element comprises a pin having a loose engagement with said roller.

3. A push-pull gauge comprising a member mounted for linear movement in response to externally applied force, means for resiliently resisting such linear movement of said member, indicating means for measuring the extent of such linear movement, and overrunning locking means for holding said member against return movement in the opposite direction, said overrunning locking means comprising:

(a) a locking element adapted to frictionally engage said member when moved into one position and to be freed from such frictional engagement when moved into another position, (b) magnetic means for urging said locking element into said one position, and (c) means for moving said locking element into said other position and freeing it from the locking effect of said magnetic means to permit said member to return to its zero position when said externally applied force is removed, (d) said locking element consisting of a plate having an aperture through which said member extends, (e) said magnetic means being arranged to pull said plate into an angled position in which the edges of said aperture pinch the sides of said member to produce said frictional engagement, (f) said plate being movable into either of two oppositely angled positions in which the edges of said aperture pinch the sides of said member to produce said frictional engagement, (g) said magnetic means being arranged to pull the plate selectively into either of said two angled positions, and (h) said means for moving said locking element being movable alternately in the direction of either of said two angled positions, by virtue of all of which said member can be locked in either of two opposed positions according to the direction of movement produced by said externally applied force.

4. Overrunning locking means for a member mounted for linear movement in response to an externally applied force, said overrunning locking means comprising:

(a) a locking element adapted to frictionally engage said member when moved into one position and to be freed from such frictional engagement when moved into another position, (b) magnetic means for urging said locking element into said one position, and (c) means for moving said locking element into said other position and freeing it from the locking effect of said magnetic means to permit said member to return to its zero position when said externally applied force is removed, (d) said locking element being movable into either of two opposed locking positions, (e) said magnetic means being arranged to urge said locking element selectively into either of said two opposed locking positions, and (f) said means for moving said locking element being movable alternately in the direction of either of said two opposed locking positions, by virtue of all of which said locking means can be adjusted to predetermine the direction of overrunning.

References Cited by the Examiner

UNITED STATES PATENTS

| | | | |
|---|---|---|---|
| 1,139,595 | 5/15 | Starr | 24—136.2 |
| 2,804,184 | 8/57 | Bjork | 192—45 |
| 3,036,381 | 5/62 | Darde | 33—172 X |

FOREIGN PATENTS 42,450    2/26   Norway.

RICHARD C. QUEISSER, *Primary Examiner.*

JOSEPH P. STRIZAK, *Examiner.*